(12) United States Patent
Logvin et al.

(10) Patent No.: US 6,904,203 B2
(45) Date of Patent: Jun. 7, 2005

(54) PASSBAND FLATTENED DEMULTIPLEXER EMPLOYING SEGMENTED REFLECTORS AND OTHER DEVICES DERIVED THEREFROM

(75) Inventors: Yury Logvin, Ottawa (CA); Adrian O'Donnell, Ottawa (CA)

(73) Assignee: MetroPhotonics Inc., Ottawa (CA)

( * ) Notice: Subject to any disclaimer, the term of this patent is extended or adjusted under 35 U.S.C. 154(b) by 40 days.

(21) Appl. No.: 10/443,978

(22) Filed: May 23, 2003

(65) Prior Publication Data

US 2004/0234201 A1 Nov. 25, 2004

(51) Int. Cl.[7] .............................................. G02B 6/34
(52) U.S. Cl. ........................... 385/37; 385/24; 385/17; 385/18; 385/47; 385/31
(58) Field of Search .............................. 385/14, 15, 37, 385/24, 46–48, 129–132, 31; 356/326

(56) References Cited

U.S. PATENT DOCUMENTS

| | | | |
|---|---|---|---|
| 6,381,052 B1 | | 4/2002 | Delisle et al. |
| 6,421,478 B1 | * | 7/2002 | Paiam ......................... 385/24 |
| 6,477,293 B1 | * | 11/2002 | Golub ......................... 385/24 |
| 2002/0061160 A1 | * | 5/2002 | Solgaard et al. .............. 385/18 |
| 2004/0042753 A1 | * | 3/2004 | Steenblik et al. ........... 385/131 |

* cited by examiner

*Primary Examiner*—Fayez G. Assaf
(74) *Attorney, Agent, or Firm*—Freedman & Associates

(57) ABSTRACT

An optical wavelength multiplexing device for use in an optical networking environment is presented. The device features optically dispersive elements combined with an array of reflectors that permit both realization of flat-top filter characteristics together with noise reduction, and in some embodiments wavelength routing, blocking or add-drop functionality. Additionally, the design of the device is easily modified to dissipate light having a wavelength that does not correspond to any predetermined wavelength channel.

17 Claims, 9 Drawing Sheets

PASSBAND FLATTENED DEMULTIPLEXER EMPLOYING SEGMENTED REFLECTORS AND OTHER DEVICES DERIVED THEREFROM

FIELD OF THE INVENTION

The invention relates to the design of integrated wavelength (de)multiplexers and more specifically to integrated wavelength management devices having flat-top passband behavior employing selective retro-reflection in combination with optically dispersive elements. Such management devices include, but are not limited to, programmable demultiplexers, reconfigurable add-drop multiplexers, and s optical interleavers.

BACKGROUND OF THE INVENTION

Planar waveguide grating devices have been widely proposed and implemented within wavelength multiplexing/demultiplexing, routing, and optical add-drop applications for dense wavelength-division multiplexing (DWDM) transmission in advanced optical networks. Commonly, this is accomplished with either an arrayed waveguide grating (AWG), or an etched reflecting or transmissive diffraction grating, such as an echelle grating. Such planar devices have gained widespread market acceptance by leveraging semiconductor manufacturing's cost reductions to optical components that traditionally were assembled from multiple discrete elements with very high labor content. When the device performs a demultiplexing function, multiple signal channels of different wavelengths which are transmitted in an optical fiber are launched into an input waveguide of the device, are exposed to a dispersive element which separates them according to their wavelength, and then each signal channel is directed to a predetermined output waveguide of a plurality of output waveguides. A typical spectral response of such a device is shown in FIG. 1. One of the most desired features of such devices is a spectral response having a wide and flat response within a passband of each signal channel. This feature allows system designers several benefits, including higher modulation frequency or data rate of the transmitted network signals whilst minimizing distortions onto the signals from the elements themselves. Further, a spectral response graph having a flat wide portion throughout the passband is indicative of a device with a large tolerance to wavelength drift of an input signal received at the input waveguide and one that is tolerant to passband wavelength drift of the device resulting from, for example, temperature variations, aging or manufacturing offsets. Also, a spectral response as indicated above reduces the effect of polarization dispersion resulted from the planar waveguide geometry. Moreover, a device having such a flat and wide passband is particularly important in DWDM networks where multiple filters are cascaded and the cumulative passband is much narrower than that of a single stage filter.

It is also highly desirable that the transmission coefficient drops sharply at the edges of the passband within the spectral response so that adjacent channels can be closely spaced without causing unacceptable crosstalk. Evidently, a sharper change in transmission coefficient also results in signals within the passband being passed with approximately equivalent attenuation, thereby, rendering the entire passband similar in response.

In a planar waveguide demultiplexing device, the shape of the spectral response is determined by a convolution of the amplitude distribution at the output focal plane, which is an image of the input waveguide mode profile formed by the dispersive grating, with the mode profile of the output waveguide itself. The channel spectral response is approximately Gaussian shaped when single-mode waveguides are used for both input waveguide and output waveguide in a conventional device. The passband is narrow, the passband top is not flat and the transition is slow resulting in relatively high crosstalk on adjacent channels unless very wide spacings are used, thereby limiting the number of channels within the system.

Many improved designs have been proposed to flatten and widen the passband spectral response. However, they all have limitations and drawbacks.

In U.S. Pat. No. 6,381,052, Delisle et al, propose a variety of different devices for providing flat top spectral response. The design of these devices includes a first wavelength dispersive element, an inversion means and second wavelength dispersive element. Unfortunately, using present manufacturing technology, this type of device is not easily produced in a maimer that is commercially viable.

SUMMARY OF INVENTION

The invention describes a flat-top optical multiplexing device comprising: an input port for receiving an optical signal;

a first wavelength dispersive element for separating a multiplexed optical signal into a plurality of optical signals, each of said optical signals corresponding to a predetermined wavelength channel, said first wavelength dispersive element in optical communication with the input port; and, an at least an optical element for reflecting said at least one of said optical signals; and, a second wavelength dispersive element for receiving the reflected optical signals from the at least an optical element, wavelength multiplexing the reflected optical signals to provide a multiplexed reflected optical signal and providing the multiplexed reflected optical signal, and at least an output port optically coupled to said second wavelength dispersive element, the output port for propagating the multiplexed reflected optical signal.

Further, the invention teaches a method of manipulating a wavelength multiplexed optical signal to produce a flat-top response, comprising:

providing a first wavelength multiplexed optical signal at an input port;

dispersing said first wavelength multiplexed optical signal in dependence upon wavelength;

providing a plurality of optical signals incident an array of mirrors, said plurality of optical signals having a first characteristic spatial separation, said plurality of optical signals corresponding to predetermined wavelength channels;

reflecting said plurality of optical signals using said array of mirrors;

providing a second plurality of optical signals from the array of mirrors, said second plurality of optical signals having a second characteristic spatial separation, said second characteristic spatial separation being less than said first characteristic spatial separation.

BRIEF DESCRIPTION OF THE DRAWINGS

The invention will now be described with reference to the figures in which.

DETAILED DESCRIPTION OF THE INVENTION

Figure 1:
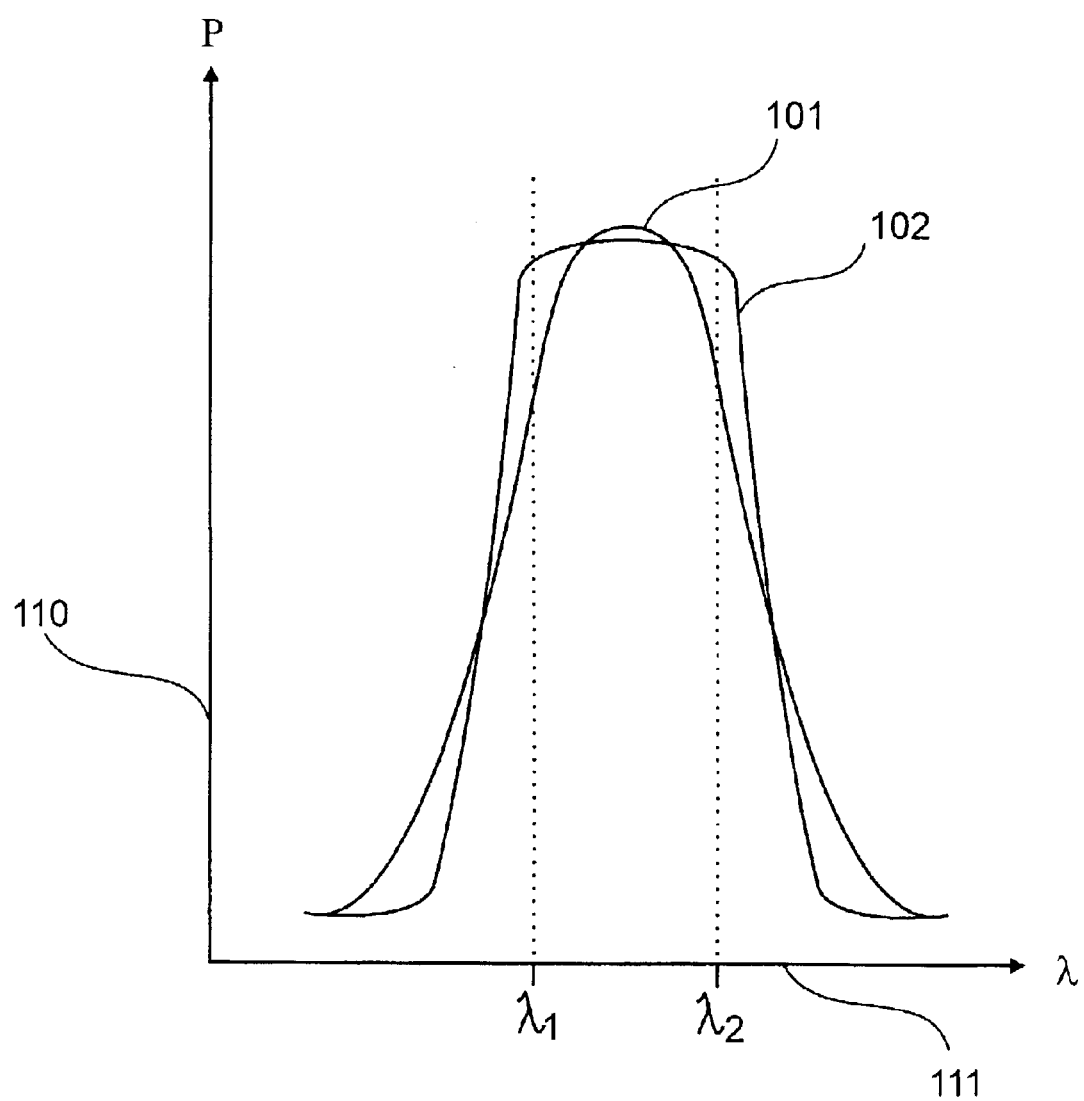
FIG. 1 is a wavelength profile featuring a first output signal from a flat-top demultiplexer and a second optical signal having a same center wavelength provided by a conventional Gaussian demultiplexer.

Referring to FIG. 1, a pair of wavelength profiles are shown. A vertical axis 110 denotes optical intensity while the horizontal axis 111 corresponds to the wavelength of an optical signal. A first profile 101 is consistent with a prior art wavelength demultiplexer, such as a conventional arrayed waveguide grating (AWG). As can be seen, the attenuation of an optical signal according to this profile is very sensitive to variations in the wavelength of the optical signal. A second profile 102 is shown representing the system designers requirements for a flat-top profile. In this case variations in wavelength of the transmitted signal result in significantly less variation in attenuation within a predetermined wavelength range, the clear passband as this is referred to by designers, where said wavelength range is defined between $\lambda_1$ and $\lambda_2$. Also, the steeper slopes on either side of the flat-top profile 102 inhibit cross talk with adjacent wavelength channels, as is well known to a person of skill in the art of multi-wavelength telecommunications.

Since a flat top device provides a more consistent insertion loss within the channel a system built around these types of devices is able to tolerate variations in wavelengths of different sources more easily than a system using conventional components. Indeed, as more wavelength channels are multiplexed on a same optical fibre it is necessary to ensure that lasers providing the optical signals have very accurate wavelengths characteristics. Consequently, these lasers are quite costly and harder to produce. Using a flat top device permits the use of less expensive more readily available lasers, and other source devices, such as wavelength converters. It also allows the same optical system to transmit signals at higher datarates, as the equivalent spectrum of these signals is broader and covers a wider portion of the optical spectrum.

Figure 2:
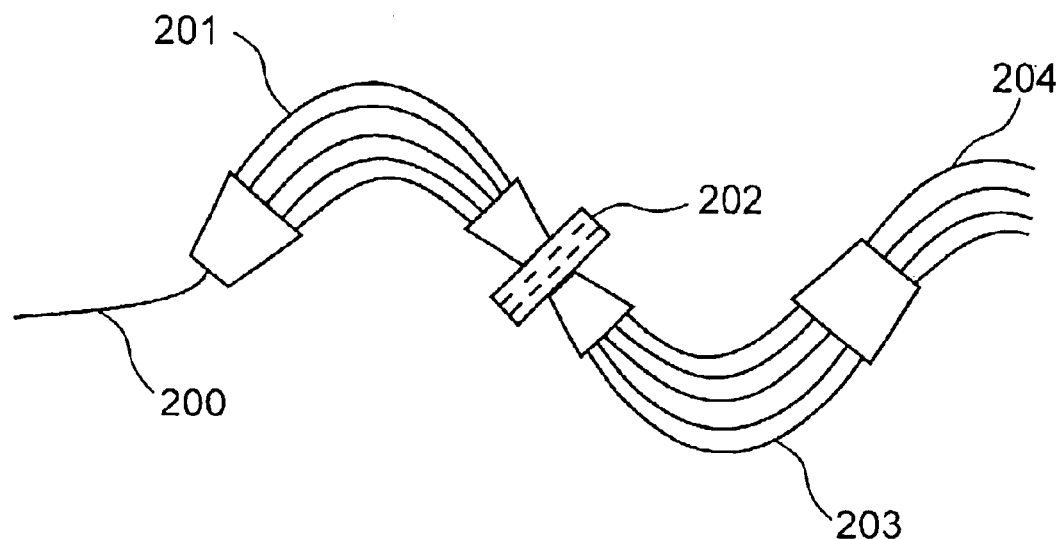
FIG. 2 is a top view of a prior art, Delisle et al, flat top wavelength dispersive element having a flat top output characteristic.

Referring to FIG. 2, a top view diagram of a prior art flat top demultiplexer is shown. This device is consistent with the invention of U.S. Pat. No. 6,381,052 by Delisle et al. issued 30 Apr. 2002. This device, based upon arrayed waveguide grating concepts (AWG), features an input waveguide 200, a first waveguide array 201, an inversion means 202, a second waveguide array 203 and output waveguides 204. In this prior art device an optical signal propagates within the input waveguide 200, is expanded and addresses the first waveguide array 201. The wavelengths are spatially dispersed when recombined after propagating within this first waveguide array 201. The optical signal is then inverted by the inversion means 202. The signal then propagates within the second waveguide array 203 and is provided at the output waveguides 204. In this prior art the inversion means 202 applies the inversion to only a narrow central portion of each channel. In this case, inverting a portion of the optical signal and subtracting this fraction of the intensity of the optical signal from the original optical signal reduces the intensity of the optical signal at the center of the supported wavelength channels. While this technique does provide flat top behaviour it is unclear how it should be implemented. Indeed, while an inversion means is specified within the prior art it is not specifically described. Conventional inversion means are fairly sophisticated and therefore, producing this type of device would likely be fairly difficult and quite expensive. Obviously, additional loss must be introduced since the light should pass several extra interfaces in the optical elements implementing spectral inversion.

Figure 3:
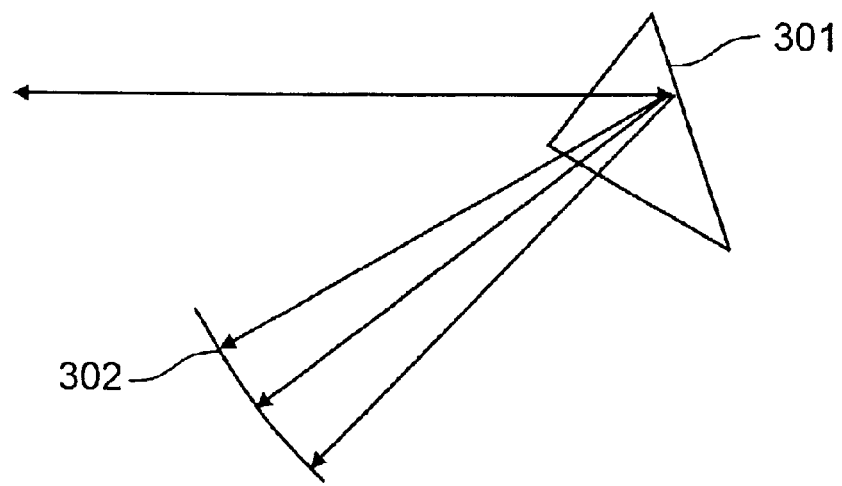
FIG. 3 is a top view diagram representing an optical ray diagram schematic that acts as a simple reflector.

Referring to FIG. 3, the equivalent of a simple curved mirror device according to a prior art is shown in order to explain the basic principles of the invention using simple ray diagrams. Light incident to a dispersive element 301 such as an AWG, echelle grating or other dispersive element is directed towards different regions of a spherical mirror 302. As is well understood by a person of skill in the art, the wavelength dispersion element 301 separates light in dependence upon wavelength. Thus, light having a first wavelength is directed to a first position on the spherical mirror 302 and light having a second other wavelength is directed to a second position on the spherical mirror 302. The spherical mirror 302 reflects all wavelengths equally back towards the wavelength dispersion element 301. After a second pass through the dispersion element 301 the light is returned along a path from which it propagated. The performance in this case is trivial, and such a system behaves as a simple mirror.

Figure 4:
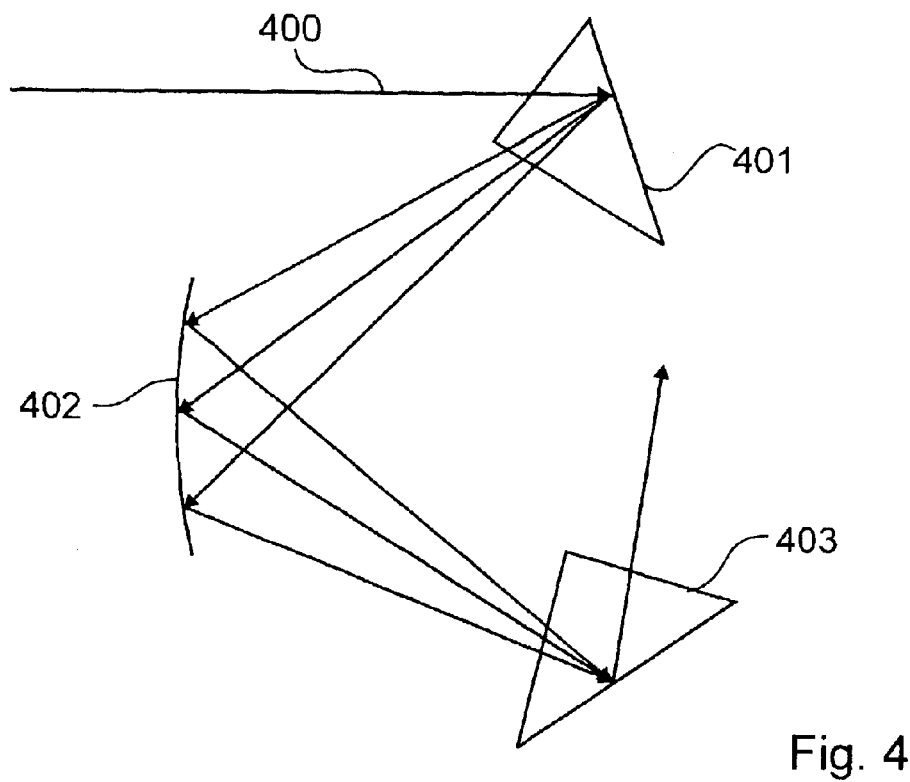
FIG. 4 is a top view diagram representing an optical ray diagram schematic of a trivial embodiment of the invention that acts as a continuous waveguide.

Referring to FIG. 4 a schematic according to a prior art is shown having a more complex system compared to FIG. 3, but again for explanation of the inventions operating principle. Light propagating along a first waveguide 400 is dispersed in dependence upon wavelength by the wavelength dispersion element 401. Optical signals propagating from the wavelength dispersion element 401 propagate to the spherical mirror 402. The spherical mirror 402, now orientated with it radius of axis with the dispersion element 401, directs the optical signals onto a second dispersion element 403,.The second dispersion element 403 receives the various optical signals. The second dispersion element 403 shown is functionally similar to the first dispersion element. The overall performance of this device is equivalent to a straight-through connection.

Figure 5:
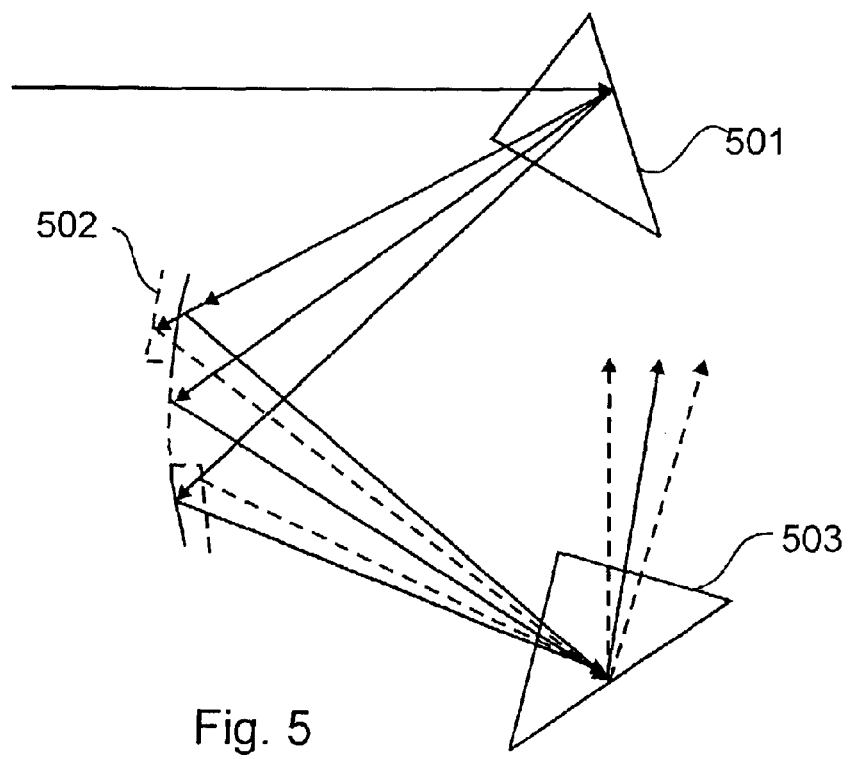
FIG. 5 is a top view diagram representing an optical ray diagram schematic of an embodiment of the invention, similar to FIG. 4, with a multi-facetted mirror disposed within the optical path.

In order to provide non-trivial optical performance the mirror in FIG. 4 should be changed as it is demonstrated in FIG. 5.

Referring to FIG. 5 an embodiment of the invention is shown featuring a segmented, or saw-like, mirror 502. In this embodiment of the invention, light propagates to a first wavelength dispersion element 501 and is dispersed in dependence upon wavelength. The dispersed light propagates to the segmented mirror 502. The segmented mirror reflects light incident thereon. Due to the segmented mirrors surfaces being reflective in different directions as we move spatially across it the segmented mirror causes some of the optical signals to propagate towards the second wavelength dispersive element 503, and others to be directed away from the second dispersive element. Due to the geometry of the reflecting surfaces of the mirror, the reflected light incident the second wavelength dispersive element 503 is not combined into a single output optical beam. Instead the various optical beams propagating from the second wavelength dispersive element 503 are provided at slightly different angles or exit points in dependence upon their wavelength.

Figure 6:
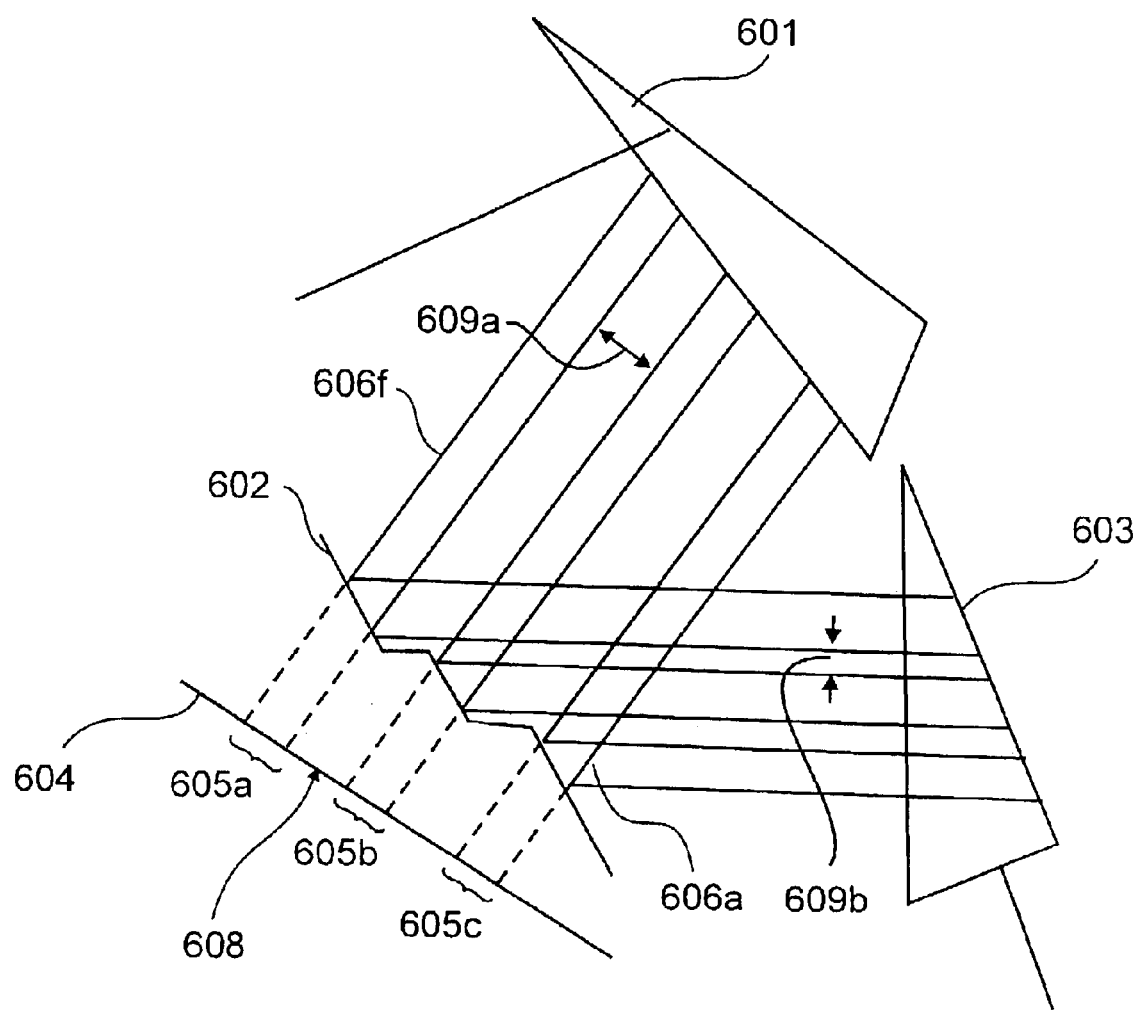
FIG. 6 is a top view diagram representing an optical ray diagram schematic demonstrating a set of optical paths provided by an embodiment of the invention in the form of a saw-like mirror which redirects the optical rays, changes the physical separation between the rays incident on the adjacent teeth of the mirror and filters unsupported wavelengths.

Referring to FIG. 6 an operation of the system of FIG. 5 is illustrated in more detail. The system includes a first wavelength dispersion element 601, a segmented, or saw-like, mirror 602, and a second wavelength dispersion element 603. In use, an optical signal is provided to the first wavelength dispersion element 601. The optical signal is dispersed in dependence upon wavelength and propagates to the segmented mirror 602. As is well known to those of skill in the art, optical communications components supporting multiple wavelengths typically support wavelengths corresponding to an industry standard known as the ITU grid. The ITU grid provides a wavelength range for each supported channel. In order to reduce the effects of wavelength dispersion the ITU grid includes unsupported wavelength ranges between the channels. Optical signals if present within these unsupported wavelength ranges are likely to introduce undesired noise into the system. Referring again to FIG. 6, the optical signals propagating from the first wavelength dispersion element 601 are shown by parallel rays 606a to 606f. The rays 606a to 606f are shown as being parallel. This has been done for illustrative purposes only. The rays 606a to 606f are incident on the segmented mirror 602. For illustrative purposes, the rays 606a to 606f are projected through the segmented mirror 602 and shown on a panel 604. A first region 605a corresponds to a first supported channel, a second region 605b corresponds to a second supported channel. The distance 609a corresponds to an unused region of between the channels corresponding to regions 605a and 605b. The segmented mirror is disposed to ensure that the optical signals corresponding to the first region 605a and the second region 605b are reflected to the second wavelength dispersion element 603. The distance 609b corresponds to the distance 609a however after reflection the optical signals have been shifted closer together and therefore 609b is substantially less than 609a. This abrupt reduction in spacing between channels corresponds to a discontinuous change in the direction of the multiplexed optical signal and leads to an improved passband flattened performance of the device. In this way, a device according to this embodiment of the invention achieves the optical performance described by Delisle et al. without an inversion means. Indeed, the fabrication of optical gratings and reflective facets are very well known in the art and relatively simple to manufacture. Further, the segmented mirror 602 acts to filter out light incident on the segmented mirror in a region that does not correspond to a supported wavelength channel. Thus, an optical signal having a wavelength corresponding to position 608 on the panel 604 would not be reflected to the second wavelength dispersion element 603. Optical signals present between adjacent supported wavelength channels are optionally diverted from optical signals corresponding to the supported wavelength channels. Thus, the device as described with reference to FIG. 6 acts as a wavelength filter for a wavelength multiplexed optical signal. In fact the transition can be extremely abrupt according to the implementation of the segmented mirror.

Figure 7:
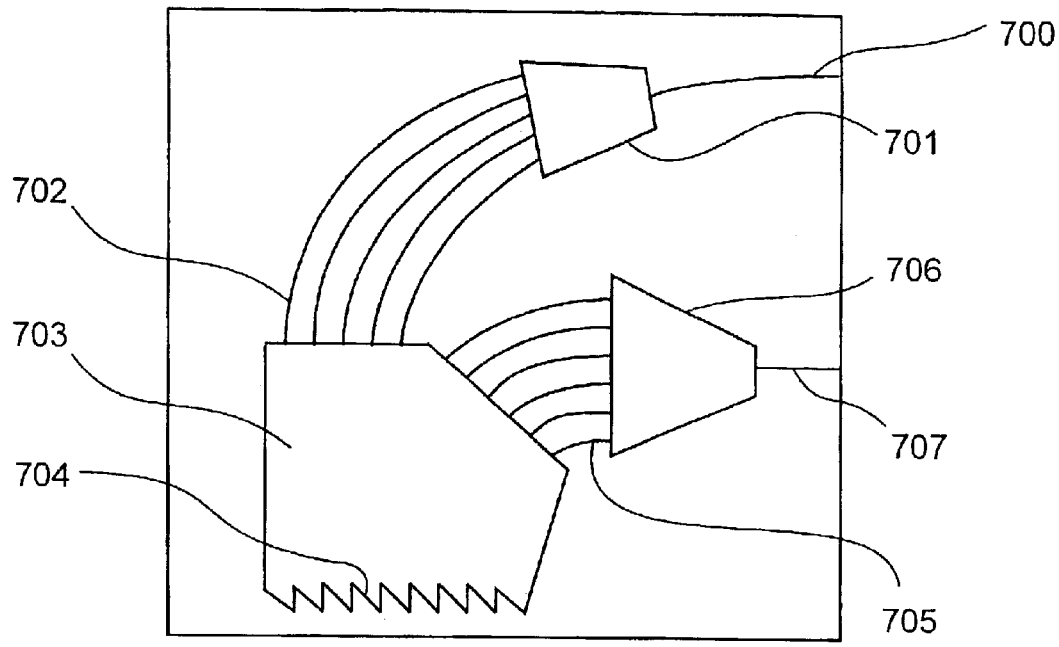
FIG. 7 is a top view of a wavelength demultiplexer according to the invention, with cascaded grating based DWDM elements and multi-facetted reflecting surface.

Referring to FIG. 7, a top view of a first embodiment of the invention is shown. This embodiment features an input waveguide 700, an input slab 701, a first array of waveguides 702 and an intermediate slab region 703, a mirror array 704, a second array of waveguides 705, an output slab 706 and an output waveguide 707. This embodiment is useable as a filter for reducing the optical intensity of any optical noise present between predetermined wavelength channels. In operation, an optical signal propagates within the input waveguide 700 and through the input slab 701 into the first array of waveguides 702. The optical signal is then provided to the intermediate slab region 703 where it interacts with the mirror array 704. The mirror array 704 reflects only those portions of the optical signal that correspond to a predetermined set of wavelength channels. Thus, optical signals that do not correspond to the predetermined wavelength channels are attenuated. The remaining optical signals are reflected from the mirror array 704 and propagate within the intermediate slab region 703. These optical signals are then coupled to the second array of waveguides 705 and then to an output slab 706. The optical signals then propagate within the output waveguide 707. In this way, unwanted optical noise is filtered from the multiplexed optical signal without a costly optical to electrical and back to optical (OEO) conversion. In order to provide a mirror array 704 having a high reflectivity it is suggested that the mirrors support total internal reflection of the optical signals incident thereon. Additionally, it is suggested that the mirror array 704 be produced using a chemical etching process incorporating a photolithographical mask.

Figure 8:
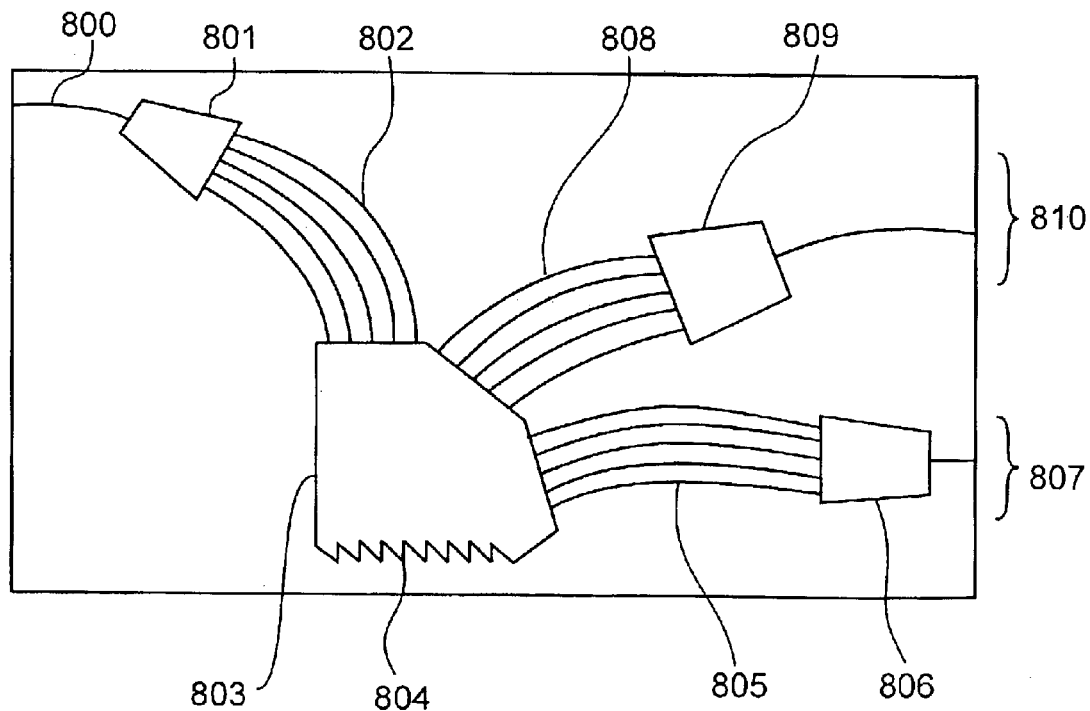
FIG. 8 is a top view of a wavelength switch according to the invention.

Referring to FIG. 8, a second embodiment of the invention is shown featuring, an input waveguide 800, an input slab 801, a first array of waveguides 802, an intermediate slab 803, an array of adjustable mirrors 804, a second array of waveguides 805, a first output slab 806, a first set of output ports 807, a third array of waveguides 808, a second output slab 809 and a second set of output ports 810. In this embodiment, a wavelength multiplexed optical signal is provided to the input waveguide 800 and propagates to the input slab 801 where it is coupled to the first array of waveguides 802. The wavelength multiplexed optical signal propagates within the intermediate slab region 803 and focuses on the array of adjustable mirrors 804. The device is designed such that the optical signals corresponding to predetermined wavelength channels are provided to specific mirrors of the array of adjustable mirrors 804. Optical signals corresponding to gaps between the predetermined wavelength channels are attenuated as they propagate past the mirror elements 804 and are dissipated. The array of adjustable mirrors is controlled to redirect the optical signals incident on the mirrors to either of the second and third arrays of waveguides 805 and 808. Optical signals provided to the second array of waveguides 805 propagate within first output slab 806 to the first output port 807. Alternatively, the optical signals with "switched" mirrors are provided to the third array of waveguides 808. Optical signals provided to the third array of waveguides 808 propagate within the second output slab 809 to the second port 810. Thus, this embodiment of the invention permits the switching of individual channels while simultaneously reducing unwanted noise between the predetermined channels. Although the direction of the optical signal is clearly specified as propagating from the input waveguide 800 to the array of adjustable mirrors 804 this need not be the case as this device is optionally using in a fully bi-directional manner.

Figure 9:
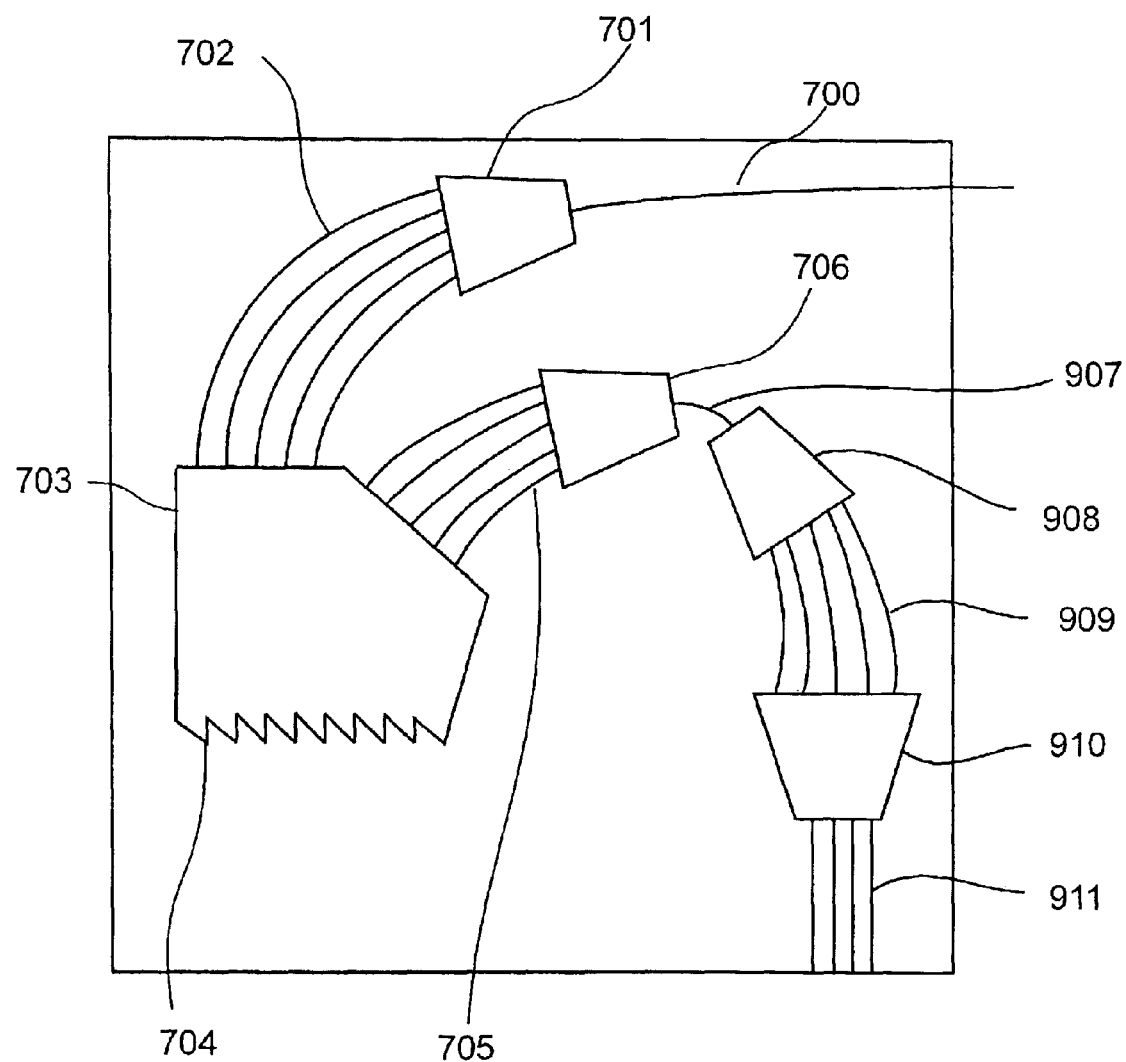
FIG. 9 is a top view of a multi-wavelength filter according to the invention.

Referring to FIG. 9, a third embodiment of the invention is shown. The function and description of elements shown in FIG. 9 are equivalent to elements of other figures having the same reference numerals. An intermediate waveguide 907 receives a multiplexed optical signal from the output slab 706. The multiplexed optical signal propagates to the demultiplexer input slab 908. Portions of the multiplexed optical signal then propagate along the demultiplexer array of waveguides 909 and are received by the demultiplexer output slab 910. A set of optical signals is provided to the array of output waveguides 911. The geometry and physical properties of the structure are chose such that each of the optical signals present in array of output waveguides 911 corresponds to a predetermined wavelength channel. Thus, this embodiment of the invention receives an multiplexed optical signal, filters the signal and then separates the filtered multiplexed optical signal into a set of optical signals each optical signal of the set of optical signals corresponding to a specific predetermined wavelength channel.

Figure 10:
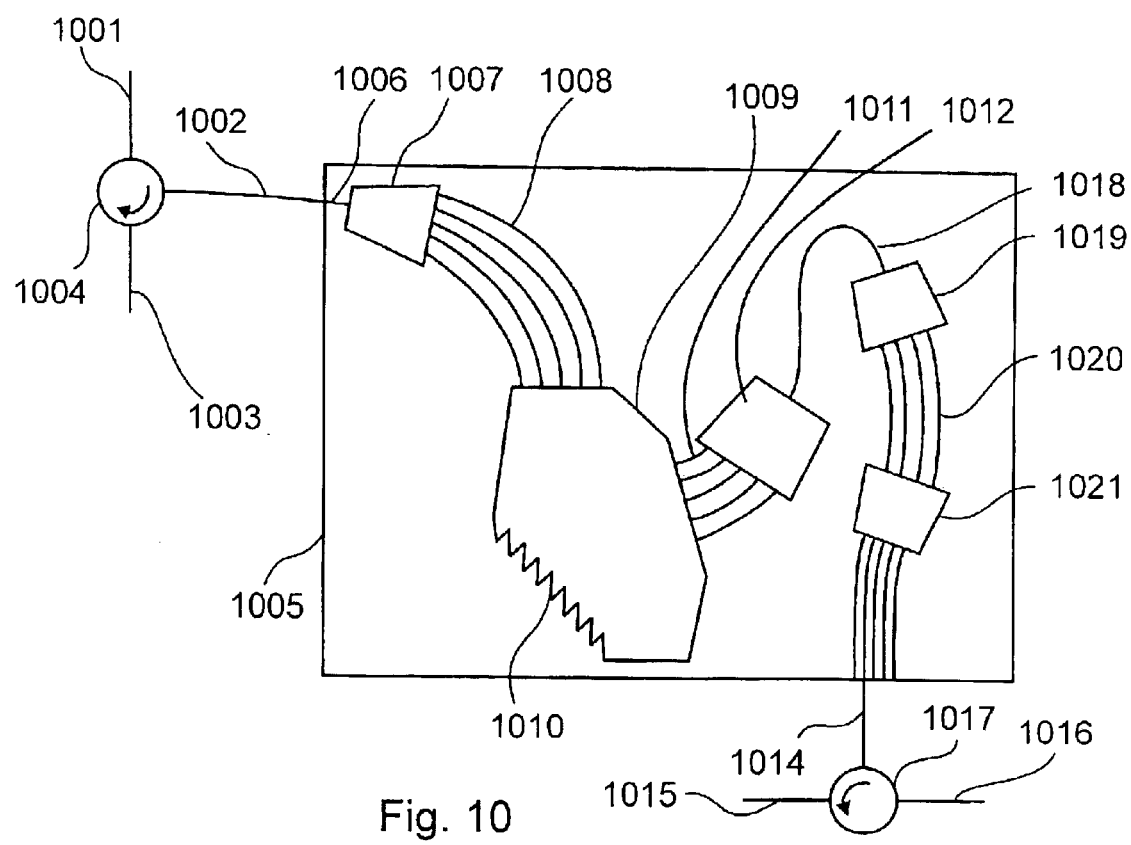
FIG. 10 is a switch device according to the invention for use with an add-drop node in which individual wavelength channels are accessible from output ports of a common substrate.

Referring to FIG. 10, a top view of a fourth embodiment of the invention is shown. This embodiment includes a first waveguide 1001, a second waveguide 1002 and a third waveguide 1003, a first circulator 1004, a waveguide substrate 1005 with an input port 1006, a first slab region 1007, a first waveguide array 1008, an intermediate slab region 1009, an array of adjustable mirrors 1010, a second waveguide array 1011, a second slab region 1012, a plurality of output ports 1013, a fourth waveguide 1014, a fifth waveguide 1015, a sixth waveguide 1016 and a second circulator 1017. In operation, an optical signal propagating within the first waveguide 1001 is coupled to the second waveguide 1002 through the first circulator 1004. The optical signal propagates along the second waveguide 1002 and enters the waveguide substrate 1005 at the input port 1006. From the input port 1006 the optical signal propagates through the first slab region 1007 and into the first array of waveguides 1008. The optical signal then propagates though an intermediate slab region 1009 and is demultiplexed into a set of channel signals. Each of the channel signals is reflected by the array of adjustable mirrors 1010. In this embodiment of the invention, the optical signal is a wavelength multiplexed optical signal supporting a plurality of channel signals, each having a characteristic wavelength range. Each characteristic wavelength range corresponds to a predetermined wavelength channel. Optical noise present within the optical signal between the predetermined wavelength channels is incident on a region of array of adjustable mirrors 1010 that causes the noise to dissipate. Thus, the optical noise is substantially prevented from coupling into either the first array of waveguides 1008 or the second array of waveguide 1011.

The mirrors of the array of adjustable mirrors 1010 are actuated to propagate individual channel signals corresponding to specific wavelength channels to either the first array of waveguides 1008 or the second array of waveguides 1011. A channel signal directed from the array of adjustable mirrors 1010 to the first array of waveguides 1008 will propagate within the first array of waveguides 1008 and continue along an optical path through the input port 1006 along the second waveguide 1002 to the first circulator 1004 The first circulator 1004 then couples this channel signal to the third waveguide 1003. Alternatively, when a channel signal is directed from the array of adjustable mirrors 1010 to the second array of waveguides 1011, the channel signal then propagates through this second array of waveguides 1011 and into the second slab region 1012. The optical signals provided to the second array of waveguides 1011 are multiplexed to create a multiplexed output signal. This multiplexed output signal is provided to and propagates along waveguide 1018. In order to provide optical signal corresponding to predetermined individual channels, the multiplexed output signal is coupled to an arrayed waveguide grating having an AWG input slab 1019, an AWG array of waveguides 1020 and an AWG output slab 1021. An output waveguide 1014 couples one such optical signal corresponding to a predetermined individual channel, henceforth referred to as a channel signal to a second circulator 1017. When the channel signal is received by the second circulator 1017, it is coupled to the fifth waveguide 1015. This channel signal is described as having been "dropped". A second channel signal corresponding to a same wavelength channel as the aforementioned channel signal propagating towards the second circulator 1017 along the sixth waveguide 1016 will be coupled into the fourth waveguide 1014 by the second circulator 1017. The second channel signal propagates along a path similar to the optical path that the first channel signal propagated along, however as the direction of propagation of the second channel signal is opposite to that the first channel signal, the second channel signal with interact with the first circulator in a different manner. Specifically, the second channel signal propagates along the second waveguide 1002 and is received by the first circulator 1004. The second channel signal is then provided to, and propagates along, the third waveguide 1003. This second channel signal described as having been "added". The terminology of "adding" and "dropping" channel signals will be well known to one of skill in the art of add/drop demultiplexing modules.

Advantageously, the device according to this embodiment also serves to reduce optical noise between the supported wavelength channels. Although only one output port is shown as being coupled to other optical equipment for adding and dropping channel signals this need not be the case. Clearly, each of the output ports 1013 is optionally coupled to a set of optical components analogous to the fourth waveguide 1014, the fifth waveguide 1015, the sixth waveguide 1016 and the second circulator 1017. Since each of the output ports 1013 is optionally coupled to an external optical circuit it is a simple matter to add additional waveguides and circulators as desired to support any available channels. A variety of different options are available to actuate the adjustable mirrors 1010. For example, the mirrors optionally incorporate a micro-electro-mechanical system (MEMS) actuator.

Figure 11:
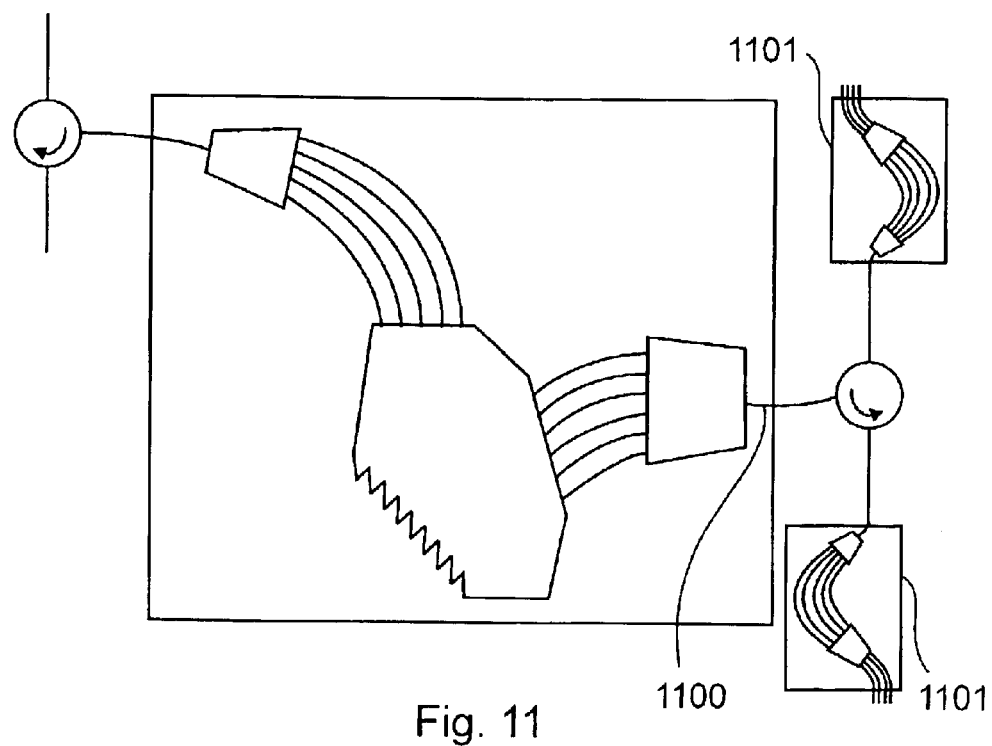
FIG. 11 is a switch device according to the invention for use with an add-drop node in which the optical signals are wavelength multiplexed proximate a common output port.

Clearly, a person of skill in the art will easily envision a wide variety of variations to the embodiment of FIG. 10. For example, rather than providing a plurality of channel signals at the various output ports 1013, the plurality of channel signals is optionally wavelength multiplexed and provided at a single common output port 1100 as described in FIG. 11.

In this configuration, other equipment 1101 in the form of conventional arrayed waveguide gratings is used to separate the individual channel signals and optionally provide other channel signals. Thus, in this configuration the number of circulators is reduced in comparison to the embodiment of FIG. 6 in which many optical wavelength channels are optionally switched.

Figure 12:
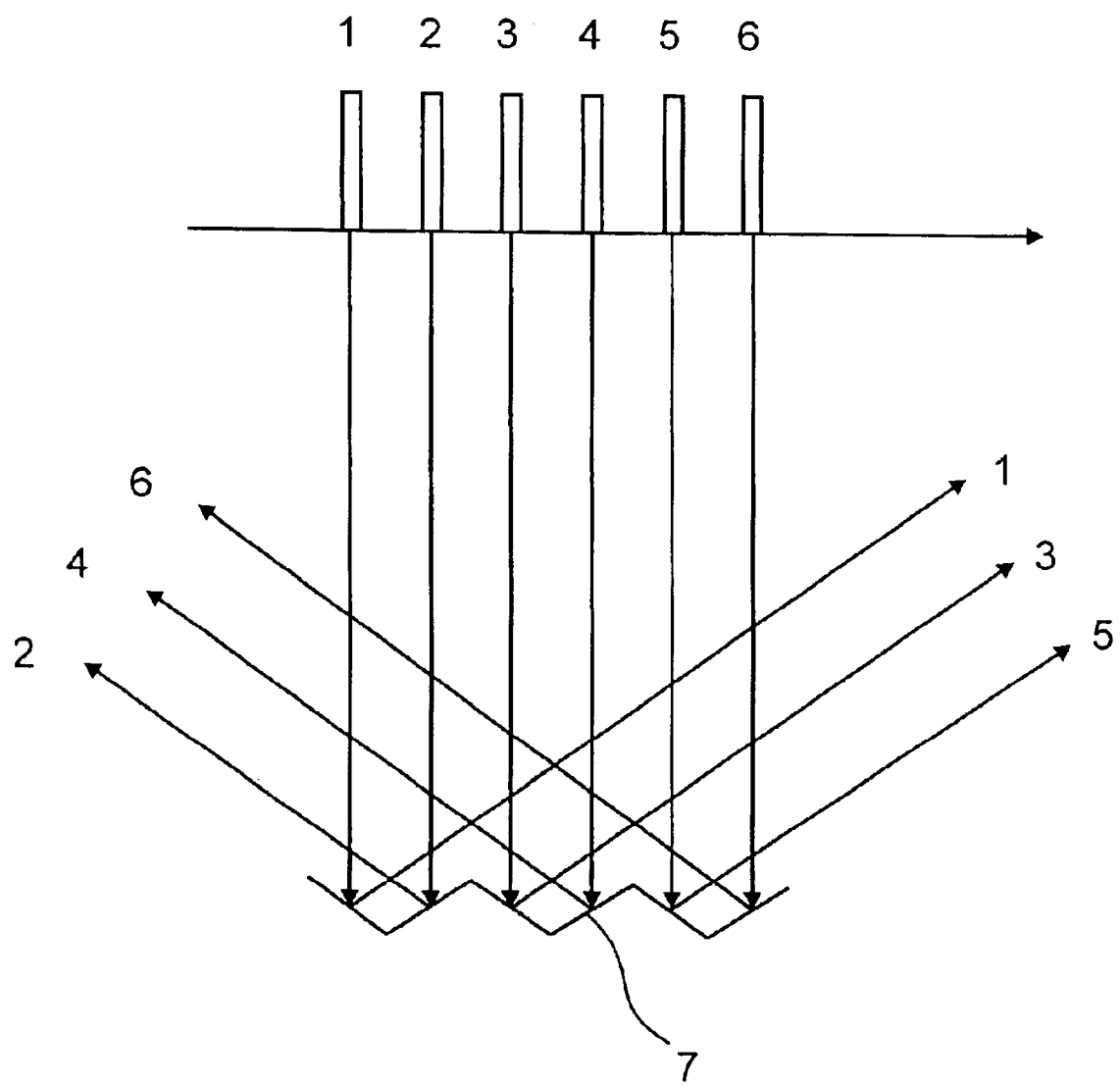
FIG. 12 is a diagram of an optical interleaver incorporating a multi-facetted mirror according to the invention; and, FIG. 13 is a ray diagram associated with an optical interleaver designed according to the invention.

Referring to FIG. 12 a ray diagram representative of the optical performance of an embodiment of the invention is shown. The diagram shows a set of rays 1 to 6, and a segmented mirror 7. For simplicity, the rays 1 to 6 are shown as being parallel. The facets of the segmented mirror 7 are disposed to reflect the even numbered rays 2, 4 and 6 is a first direction and to reflect the odd numbered rays 1, 3 and 5 in a second, other direction. A person of skill in the art will be aware that the optical behavior of this device is beneficial for providing an optical interleaver.

Figure 13:
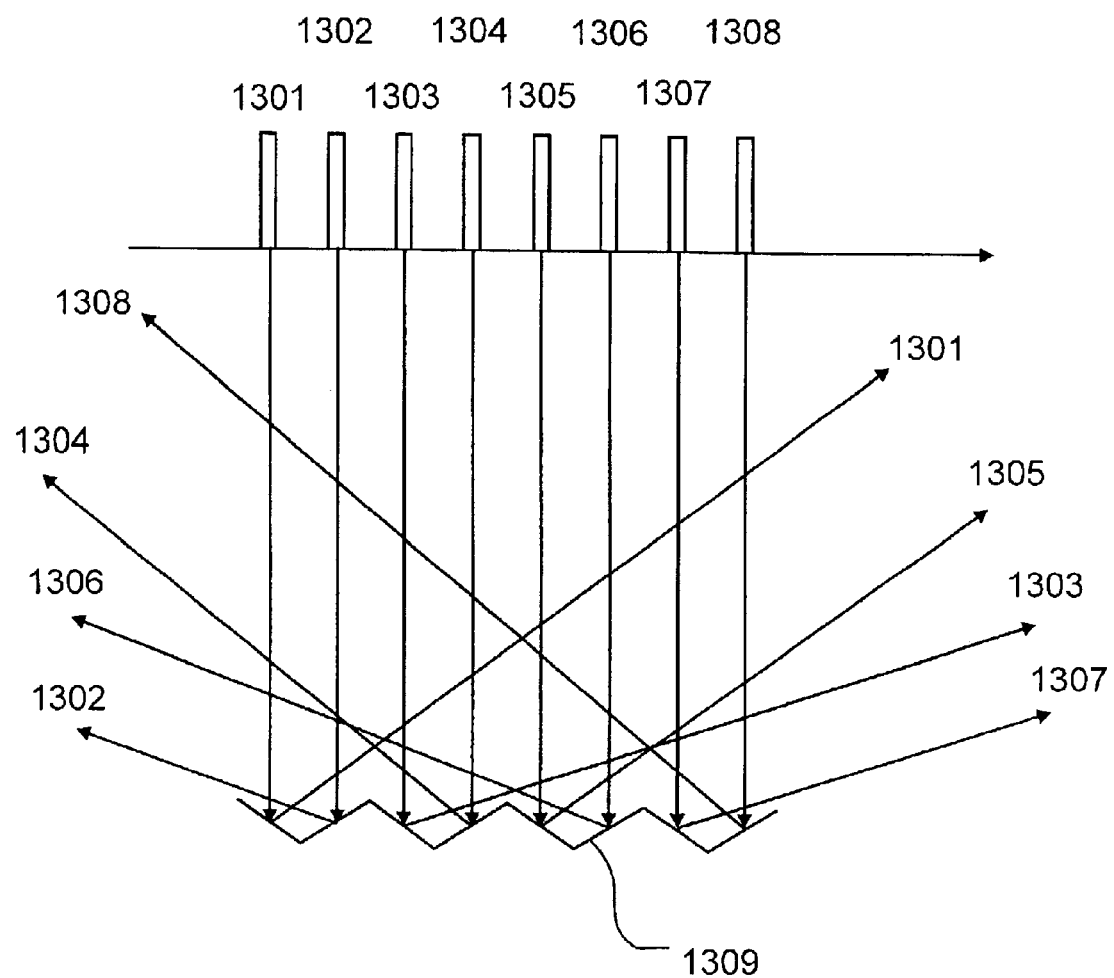

Alternatively, as shown in FIG. 13, a ray diagram corresponding to a design of an optical interleaver according to the invention is shown. The interleaver directs optical signals incident a segmented mirror 1309 to one of four output slabs. In this embodiment of the invention there are four sets of facets in the segmented mirror 1309. A set of facets is for directing an optical signal provided from a predetermined input port to a specific output slab. Thus, rays 1301 and 1305 are directed to a first port, rays 1302 and 1306 propagate to a second port, rays 1303 and 1307 propagate to a third port and rays 1304 and 1308 propagate to a fourth port. Hence 25 GHz channels are generated and separated from 4 streams of 100 GHz channels. Clearly, other such variations will be apparent to one of skill in the art.

It will be apparent to one of skill in the art that the segmented, saw-like mirror structure is provides flat channel shapes. These channel shapes are highly beneficial. Numerous other embodiments of the invention may be envisioned by one of skill in the art of optical communications and arrayed waveguide devices.

What is claimed is:

1. A flat-top optical multiplexing device comprising:
   an input port for receiving an optical signal;
   a first wavelength dispersive element having a first linear dispersion characteristic for separating a multiplexed optical signal into a plurality of optical signals having a first spatial separation, each of said optical signals corresponding to a predetermined wavelength channel, said first wavelength dispersive element in optical communication with the input port; and,
   an at least an optical element for reflecting said at least one of said optical signals; and,
   a second wavelength dispersive element having a linear dispersion characteristic substantially equivalent to that of the first wavelength dispersive element for receiving the reflected optical signals from the at least an optical element, the received reflected optical signals having a second spatial separation substantially different than the first spatial separation, wavelength multiplexing the reflected optical signals to provide a multiplexed reflected optical signal and providing the multiplexed reflected optical signal, and
   at least an output port optically coupled to said second wavelength dispersive element, the output port for propagating the multiplexed reflected optical signal.

2. A flat-top optical multiplexing device according to claim 1, wherein the optical element is optically bi-directional.

3. A flat-top optical multiplexing device according to claim 1, comprising an optically attenuating region, wherein, the optical element comprises a tunable reflector for selectively optically coupling an optical signal corresponding to a predetermined wavelength channel to either one of the second wavelength dispersive element or the optically attenuating region.

4. A flat-top optical multiplexing device according to claim 1, wherein, the optical element comprises a tunable reflector for selectively optically coupling an optical signal corresponding to a predetermined wavelength channel to either one of the second wavelength dispersive element or back reflecting the optical signal to the first wavelength dispersive element.

5. A flat-top optical multiplexing device according to claim 1, wherein the optical element comprises a series of reflective segments forming a mirror, each of the segments of the mirror corresponding to a predetermined wavelength channel and the spatial separation between the optical signals incident on the adjacent segments of the mirror is reduced as a result of a reflection of said signals on said adjacent segments.

6. A flat-top optical multiplexing device according to claim 1, wherein the optical element comprises a series of reflective segments and at least one of said reflective segments is comprises a micro-electro-mechanical mirror.

7. A flat-top optical multiplexing device according to claim 1, wherein the optical element comprises a series of reflective segments, the reflective segments forming a pattern in the for form of a saw, the reflective segments fabricated by a chemical etching using a photolithographical mask.

8. A flat-top optical multiplexing device according to claim 1, wherein the optical element comprises a series of reflective segments at least one of the reflective segments for reflecting light using total internal reflection.

9. A flat-top optical multiplexing device according to claim 1, comprising:
   a third wavelength dispersive element optically coupled to the at least an optical element, said third wavelength dispersive element for receiving optical signals from the optical element and providing a second reflected multiplexed optical signal; and,
   a second output port optically coupled to the third wavelength dispersive element, said second output port for providing the second reflected multiplexed optical signal.

10. A flat-top optical multiplexing device according to claim 9, wherein the optical element comprises a tunable reflector for selectively optically coupling an optical signal corresponding to a predetermined wavelength channel to either one of the second or third wavelength dispersive elements.

11. A flat-top optical multiplexing device according to claim 10, wherein the tunable reflector comprises an array of tunable reflection elements, each reflection element of the array of tunable reflectors being able to selectively optically couple an optical signal corresponding to a predetermined wavelength channel to either one of the second wavelength dispersive element or the third wavelength dispersive element.

12. A flat-top optical multiplexing device according to claim 1, comprising:
   a third wavelength dispersive element for receiving the at least one optical signal from the output port, said third wavelength dispersive element for dispersing; and
   a plurality of output ports, each of said plurality of output ports optically coupled to the second wavelength dispersive element, said plurality output ports for providing optical signals corresponding to the supported wavelength channels.

13. A method of manipulating a wavelength multiplexed optical signal to produce a flat-top response, comprising the steps of:

providing a first wavelength multiplexed optical signal at an input port;

providing a first wavelength dispersive element;

dispersing said first wavelength multiplexed optical signal in dependence upon wavelength;

providing a plurality of optical signals from said first wavelength dispersive element, said plurality of optical signals having a first characteristic spatial separation, said plurality of optical signals corresponding to predetermined wavelength channels;

reflecting said plurality of optical signals using said array of mirrors;

providing a second plurality of optical signals to a second wavelength dispersive element, said second plurality of optical signals having a second characteristic spatial separation, said second characteristic spatial separation being less than said first characteristic spatial separation.

14. A method according to claim 13, comprising:

wavelength multiplexing the second plurality of optical signals; and, providing a wavelength multiplexed optical signal at an output port.

15. A method according to claim 14, wherein the step of reflecting comprises dissipating light having a wavelength that does not correspond to any of the predetermined wavelength channels.

16. A method according to claim 13, comprising varying a characteristic angle of a mirror of the array of mirrors in order to selectably direct an optical signal incident thereon.

17. A method according to claim 16, wherein the angle of the mirror is controlled via an electrical control signal.

* * * * *